United States Patent
Yamamoto et al.

(10) Patent No.: US 10,254,740 B2
(45) Date of Patent: Apr. 9, 2019

(54) POSITIONING CONTROL DEVICE FOR ACTUATOR PROVIDED WITH STRAIN WAVE GEARING USING FULL-CLOSED CONTROL WITH STATE OBSERVER

(71) Applicants: HARMONIC DRIVE SYSTEMS INC., Shinagawa-ku, Tokyo (JP); NAGOYA INSTITUTE OF TECHNOLOGY, Nagoya-shi, Aichi (JP)

(72) Inventors: Masafumi Yamamoto, Azumino (JP); Yoshifumi Okitsu, Azumino (JP); Makoto Iwasaki, Nagoya (JP)

(73) Assignees: Harmonic Drive Systems Inc., Shinagawa-ku, Tokyo (JP); Nagoya Institute of Technology, Nagoya-shi, Aichi (JP)

( * ) Notice: Subject to any disclaimer, the term of this patent is extended or adjusted under 35 U.S.C. 154(b) by 91 days.

(21) Appl. No.: 15/553,835

(22) PCT Filed: Sep. 27, 2016

(86) PCT No.: PCT/JP2016/078512
§ 371 (c)(1),
(2) Date: Aug. 25, 2017

(87) PCT Pub. No.: WO2018/061097
PCT Pub. Date: Apr. 5, 2018

(65) Prior Publication Data
US 2018/0246489 A1    Aug. 30, 2018

(51) Int. Cl.
*F16H 1/32*    (2006.01)
*G05D 3/12*    (2006.01)
(Continued)

(52) U.S. Cl.
CPC ............... *G05B 19/19* (2013.01); *F16H 1/32* (2013.01); *G05B 11/36* (2013.01); *G05D 3/12* (2013.01);
(Continued)

(58) Field of Classification Search
CPC .......... G05B 19/19; G05B 2219/42005; G05B 11/36; G05D 3/12; F16H 1/32; F16H 49/001
(Continued)

(56) References Cited

U.S. PATENT DOCUMENTS 5,135,186 A * 8/1992 Ako .................... B64C 13/16
244/195
2011/0054820 A1* 3/2011 Sasaki ................. G05B 19/404
702/94
(Continued)

FOREIGN PATENT DOCUMENTS

JP    5-115189 A    5/1993
JP    2006-335529 A    12/2006
(Continued)

OTHER PUBLICATIONS

MIT_observer.pdf Topic #14 (Year: Oct. 17, 2010) MIT OpenCourseWare.*
(Continued)

*Primary Examiner* — Eduardo Colon Santana
*Assistant Examiner* — Devon Joseph
(74) *Attorney, Agent, or Firm* — Buchanan Ingersoll & Rooney PC

(57) ABSTRACT

A positioning control system is provided with a state-feedback control system with a state observer as a full-closed control system for driving and controlling a motor so that a load shaft, which is an output shaft of a strain wave gearing, is positioned at a target position on the basis of a (Continued)

load shaft position actually detected. The state observer estimates a motor shaft position and a motor velocity based on a control input for the motor and the load shaft position. The state-feedback control system feeds back the state quantity of the object of control using the load shaft position as well as estimated motor shaft position and estimated motor velocity obtained by the state observer. It is possible to suppress resonant vibration caused by angular transmission error in the strain wave gearing and perform highly accurate positioning.

2 Claims, 15 Drawing Sheets

(51) Int. Cl.
*F16H 49/00* (2006.01)
*G05B 11/36* (2006.01)
*G05B 19/19* (2006.01)

(52) U.S. Cl.
CPC .. *F16H 49/001* (2013.01); *G05B 2219/42005* (2013.01)

(58) Field of Classification Search
USPC .......................................................... 318/611
See application file for complete search history.

(56) References Cited

U.S. PATENT DOCUMENTS

| | | |
|---|---|---|
| 2011/0248661 A1 | 10/2011 | Okitsu et al. |
| 2011/0251722 A1 | 10/2011 | Okitsu et al. |
| 2012/0271459 A1 | 10/2012 | Okitsu et al. |
| 2014/0203752 A1 | 7/2014 | Yamamoto et al. |

FOREIGN PATENT DOCUMENTS

| | | |
|---|---|---|
| JP | 5207071 B2 | 6/2013 |
| JP | 5453606 B2 | 3/2014 |
| JP | 5574228 B2 | 8/2014 |
| JP | 5656193 B2 | 1/2015 |
| JP | 5839510 B2 | 1/2016 |

OTHER PUBLICATIONS

University of Minnesota ME 8281: Advanced Control Systems Design, 2001-2012 (Year: 2001); Topic: State feedback and Observer Feedback, pp. 93-121.*
International Search Report (PCT/ISA/210) dated Nov. 8, 2016, by the Japanese Patent Office as the International Searching Authority for International Application No. PCT/JP2016/078512.
Written Opinion (PCT/ISA/237) dated Nov. 8, 2016, by the Japanese Patent Office as the International Searching Authority for International Application No. PCT/JP2016/078512.

* cited by examiner

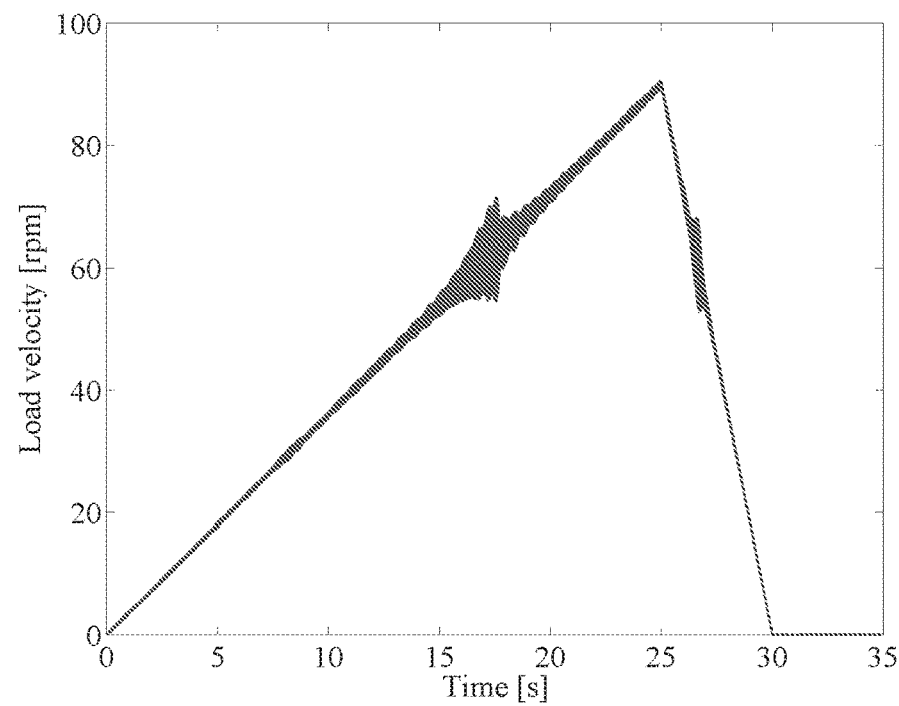
FIG. 6(a) LOAD VELOCITY RESPONCE
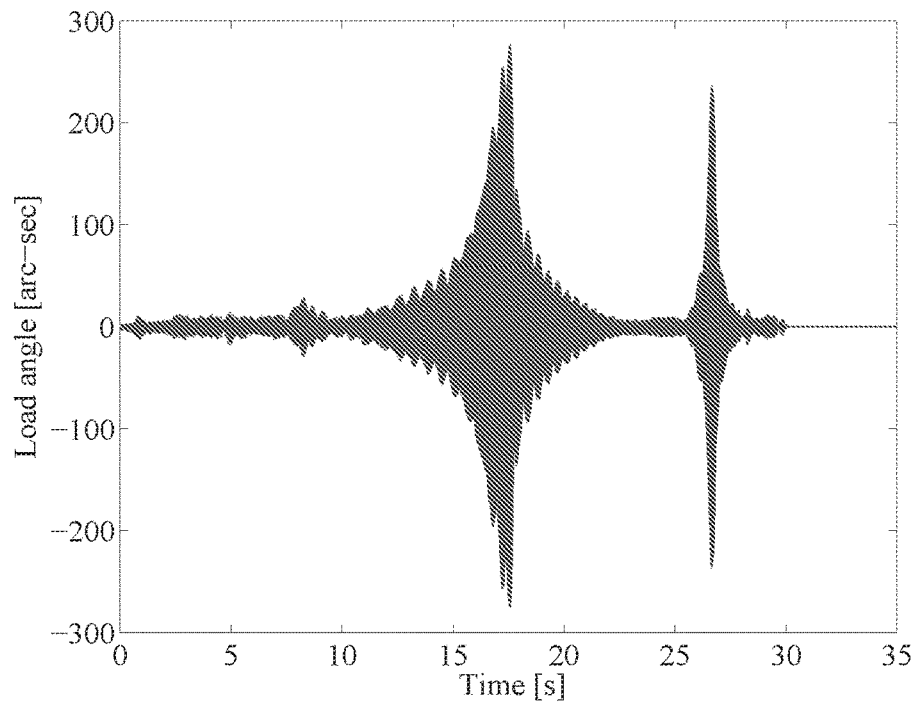
FIG. 6(b) LOAD POSITION VIBRATION COMPONENT

FIG. 12(a)
OPEN-LOOP TRANSMISSION CHARACTERISTIC
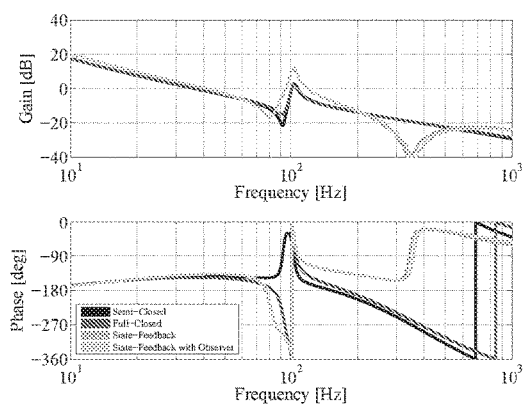
FIG. 12(b)
NYQUIST DIAGRAM
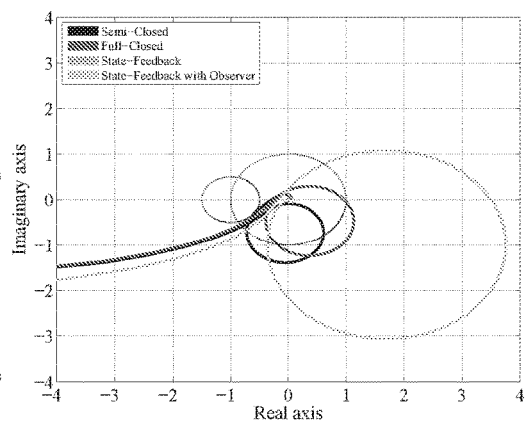
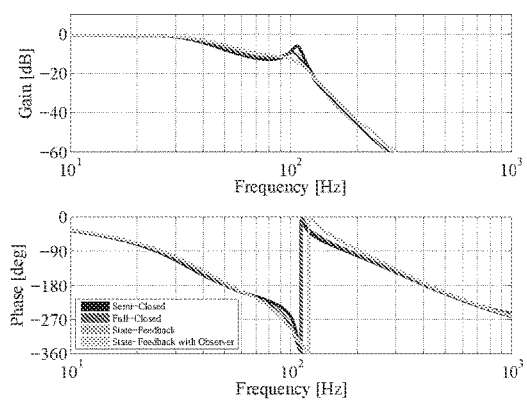
CLOSED-LOOP TRANSMISSION CHARACTERISTIC
(FROM COMMAND TO LOAD SHAFT)
FIG. 12(c)
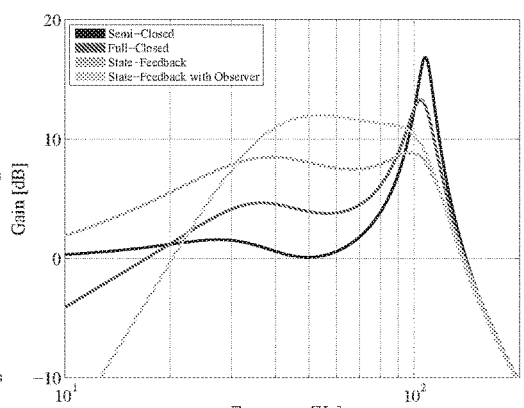
ANGULAR TRANSMISSION ERROR
TRANSFER FUNCTION
(FROM ANGULAR TRANSMISSION ERROR TO LOAD SHAFT)
FIG. 12(d)

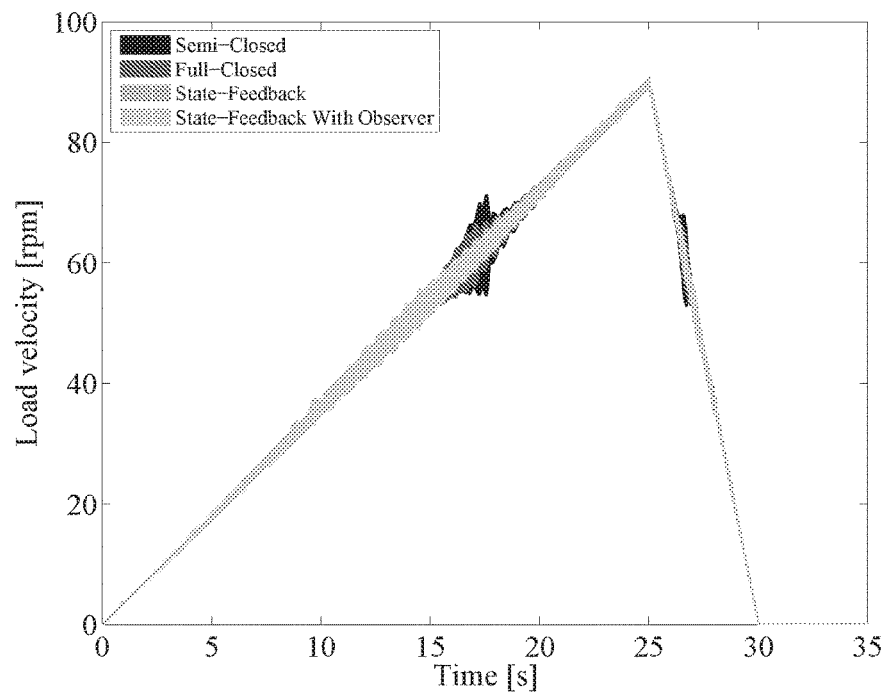
FIG. 13(a) LOAD VELOCITY
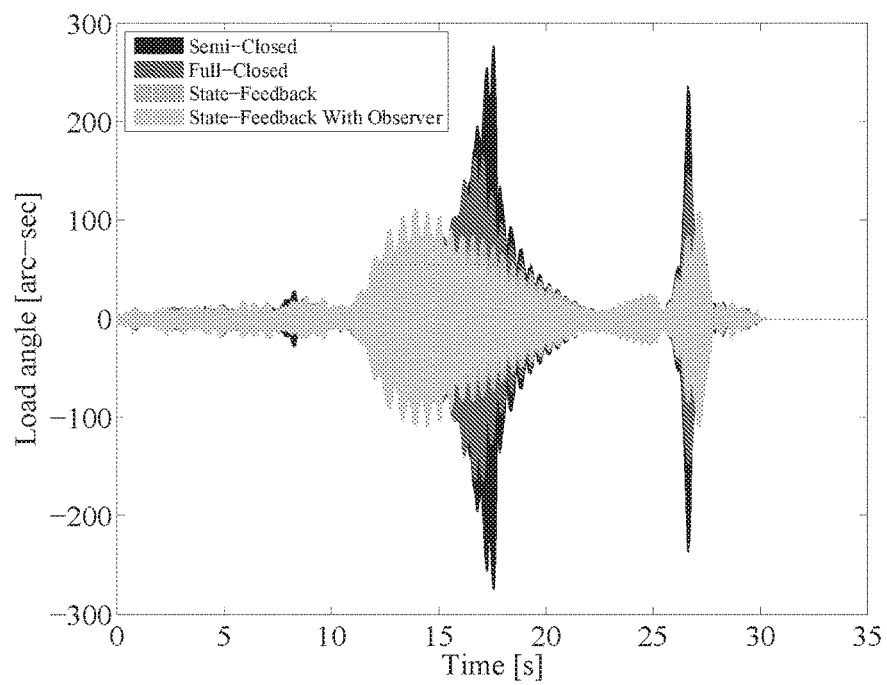
FIG. 13(b) LOAD POSITION VIBRATION COMPONENT

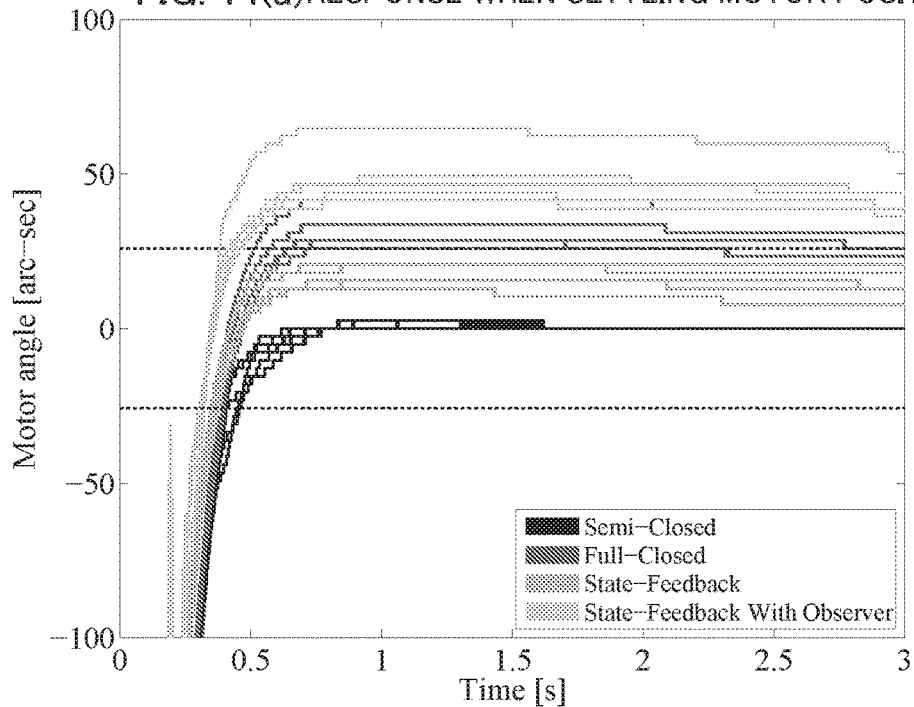
FIG. 14(a) RESPONSE WHEN SETTLING MOTOR POSITION
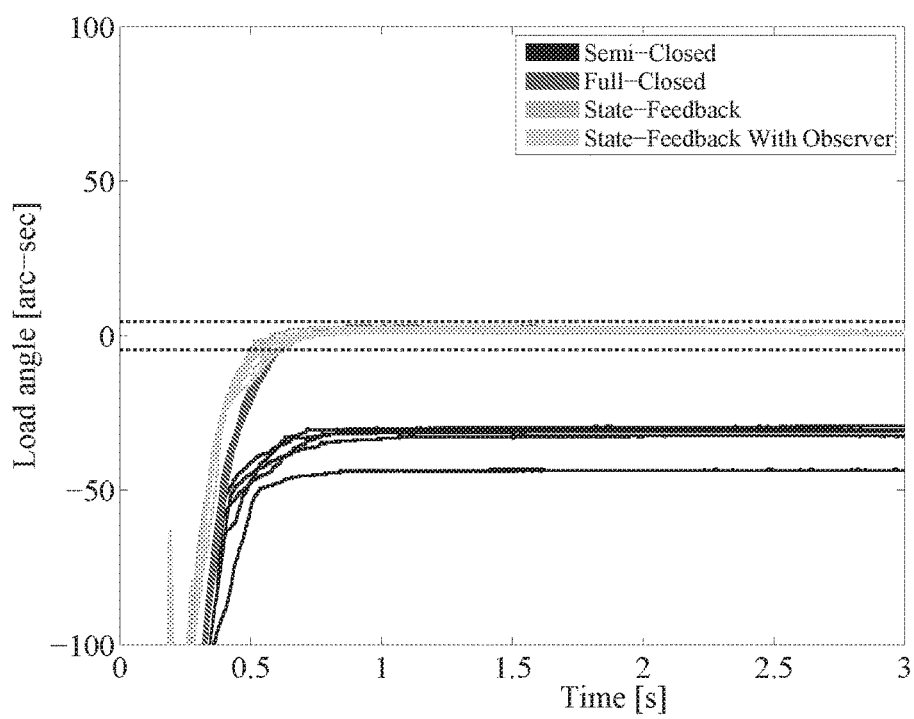
FIG. 14(b) RESPONSE WHEN SETTLING LOAD POSITION

POSITIONING CONTROL DEVICE FOR ACTUATOR PROVIDED WITH STRAIN WAVE GEARING USING FULL-CLOSED CONTROL WITH STATE OBSERVER

TECHNICAL FIELD

The present invention relates to a device for performing positioning control of an actuator provided with a configuration for reducing rotational output of a motor using a strain wave gearing, and transmitting the output to a load shaft. More specifically, the present invention relates to a positioning control device for suppressing resonant vibration caused by angular transmission error in a strain wave gearing, and performing suitable positioning control of a load shaft, using full-closed control with a state observer in which only load shaft information is employed.

BACKGROUND ART

Actuators provided with a motor and a strain wave gearing as a reduction mechanism are well-known. There are numerous control systems for actuators having this configuration to which is applied a semi-closed control system for performing positioning control of a load shaft for transmitting reduced output rotation of the strain wave gearing to a load side, using only motor shaft information. However, there is a problem with semi-closed control systems in that vibration is generated in the load shaft by a nonlinear element present in the strain wave gearing, and positioning accuracy inevitably declines. The present inventors have therefore proposed methods for compensating for angular transmission error using a model that has been analyzed, modeled, and constructed with regard to angular transmission error (Patent Documents 1 to 4).

In contrast, there have also been proposed full-closed control systems for controlling a load shaft position using information from encoders attached to each of a motor shaft and a load shaft in an actuator provided with a strain wave gearing. The present inventors have proposed a method for preventing degradation in position control performance of the load shaft caused by a nonlinear characteristic of the strain wave gearing in such a control device (Patent Document 5).

PRIOR ART DOCUMENTS

Patent Documents

Patent Document 1: Japanese Patent No. 5453606
Patent Document 2: Japanese Patent No. 5574228
Patent Document 3: Japanese Patent No. 5207071
Patent Document 4: Japanese Patent No. 5839510
Patent Document 5: Japanese Patent No. 5656193

SUMMARY OF THE INVENTION

Problems to be Solved by the Invention

Although control performance can be improved when applying a full-closed control system for performing position control of a load shaft using information from an encoder attached to the load shaft, an encoder must be installed on the load shaft in addition to an encoder on the motor shaft, and the increased cost and numerous associated problems are presented in regard to ensuring installation space for the encoder. It is thought, however, that the utilization of load shaft encoders will increase in light of lowered encoder costs and further improvements in performance of a load shaft which is a final controlled quantity.

An object of the present invention is to provide a device for performing positioning control of an actuator provided with a strain wave gearing, in which a full-closed control system using only load shaft information and not motor shaft information is applied, resonant vibration caused by angular transmission errors of the strain wave gearing is suppressed, and the load shaft can be positioned with good accuracy.

Means for Solving the Problems

A positioning control device of the present invention is provided with a state-feedback control system that uses only load shaft information, as a full-closed control system for performing positioning control of an actuator to be controlled.

In an actuator provided with a strain wave gearing to be controlled, torsional vibration between a motor and a load shaft is excited when motor torque and load torque are applied, and the actuator is therefore ordinarily handled as a dual inertial model that takes a torsion characteristic into account. When designing a control system in which only load shaft information is used, phase lag relative to the resonant frequency in a high-frequency region is increased as a characteristic of a dual inertial model, and the control system easily loses stability.

In the positioning control device of the present invention, a state observer is used together with a state-feedback control system. Motor shaft information (motor shaft position and motor velocity) is estimated from the control inputted to the controlled object and load shaft information that has actually been detected, stability is achieved in the control system, and accurate positioning control is thereby performed on the load shaft.

Specifically, according to the present invention, there is provided a device for performing positioning control of an actuator provided with a strain wave gearing, for driving and controlling an actuator provided with a configuration in which motor rotation is reduced by a strain wave gearing and transmitted to a load shaft, and performing positioning control of the load shaft, wherein the device for performing positioning control of an actuator is provided with a state-feedback control system with an state observer as a full-closed control system for driving and controlling the motor so that the load shaft is positioned at a target position, on the basis of an actually detected load position;

the state observer estimates motor shaft position and motor velocity on the basis of the load shaft position and control inputted to the motor of the actuator to be controlled in the state-feedback control system; and the state-feedback control system feeds back the state quantity of the object of control, using the load shaft position as well as estimated motor shaft position and estimated motor velocity obtained from the observer.

Effects of the Invention

The effectiveness of positioning control performed by the positioning control device of the present invention was confirmed by experiments using actual equipment as performed by the present inventors. In addition, according to the present invention, adopting full-closed control system allows compression of variation and steady-state deviation when settling positioning control.

Furthermore, the encoder may be attached only to the load shaft, and therefore load shaft control performance can be improved without increasing the number of sensors in a prior-art semi-closed control system. In addition, problems such as increased cost due to an increase in the number of sensors and ensuring installation space for encoders can be overcome.

BRIEF DESCRIPTION OF THE DRAWINGS

FIGS. 6(a) and 6(b) are graphs showing response results of a constant acceleration test;

FIGS. 12(a)-12(d) are graphs showing frequency characteristics of respective control systems;

FIGS. 13(a) and 13(b) are graphs showing a response result from a low-acceleration test using actual equipment; and FIGS. 14(a) and 14(b) are graphs showing a response result from a high-acceleration test using actual equipment.

MODE FOR CARRYING OUT THE INVENTION

A device for performing positioning control of an actuator provided with a strain wave gearing according to the present invention will be described hereinafter with reference to the drawings.

[Overall Configuration of Positioning System]

Figure 1A:
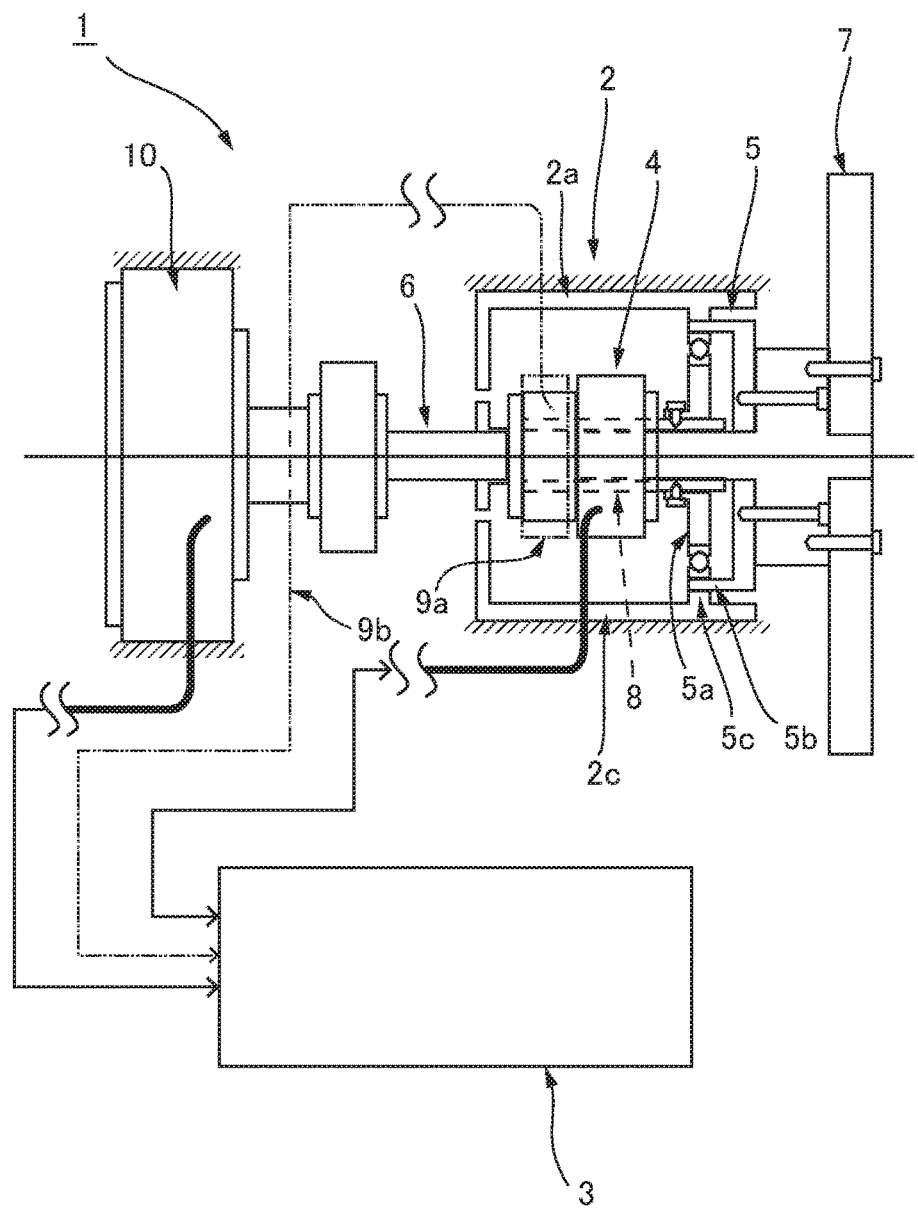
FIG. 1A is an explanatory view showing an example of a configuration of an actuator, which is an object of control, in the present invention.

FIG. 1A is an explanatory view showing an example of a configuration of a positioning system provided with an actuator that includes a strain wave gearing as a reduction gear, which is the object of control of the present invention. A positioning system 1 is provided with an actuator 2 and a positioning control device 3 for performing positioning control of the actuator. The actuator 2 is provided with a motor 4, a strain wave gearing 5 for reducing the output rotation of the motor 4, and a load shaft 6 that rotates according to the reduced rotation outputted from the strain wave gearing 5.

The strain wave gearing 5 is provided with a wave generator 5a fixed to a motor shaft 8, a flexible externally toothed gear 5b fixed to the load shaft 6, and a rigid internally toothed gear 5c fixed to the side of an actuator housing 2a. A load device 7 attached to the load shaft 6 is driven in a rotating manner by the actuator 2. A load shaft encoder 10 for detecting the load shaft position is attached to the load shaft 6.

The positioning control device 3 is provided with a full-closed control system for controlling the driving of the motor 4 and performing positioning of the load shaft 6 (and therefore the load device 7) on the basis of only the load shaft position detected by the load shaft encoder 10. The full-closed control system is a state-feedback control system with a state observer.

A motor shaft encoder 9a used in the below-described verification tests and a signal line 9b for the encoder are shown by the imaginary line in FIG. 1A.

[Angular Transmission Error of Strain Wave Gearing]

Figure 1B:
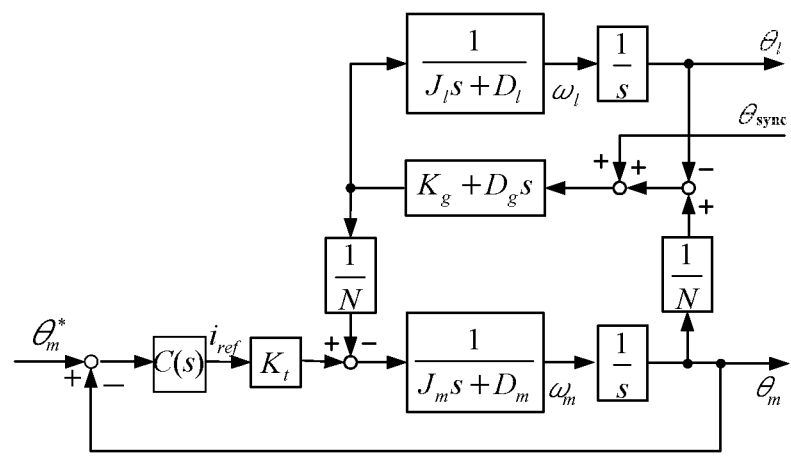
FIG. 1B is a block diagram of a semi-closed control system.

FIG. 1B is a block diagram showing a semi-closed control system in a case in which the actuator to be controlled in the positioning system 1 is considered as a dual inertial system model. The object of control is ordinarily handled as a dual inertial system model comprising a motor-side inertial system that includes a motor shaft on the input side of the strain wave gearing and a load-side inertial system that includes a load shaft on the output side of the strain wave gearing. The reference labels in the drawing are as follows. C(s) represents a P-PI compensator for feeding back the motor shaft position and the velocity, and the aforedescribed angular transmission error is a position disturbance $\theta_{sync}$ inputted to a torsion position between a motor shaft position $\theta_m$ and a load shaft position $\theta_l$ in the drawing.

$J_m$: Motor shaft inertial moment
$D_m$: Motor shaft viscosity coefficient of friction
$J_l$: Load shaft inertial moment
$D_l$: Load shaft viscosity coefficient of friction
$D_g$: Viscosity coefficient of friction for reduction gear
N: Reduction ratio
$K_t$: Motor torque constant
$K_g$: Spring characteristic
$\theta_m$: Motor shaft position
$\omega_m$: Motor velocity
$\theta_l$: Load shaft position
$\omega_l$: Load velocity
$\theta_{sync}$: Angular transmission error
$i_{ref}$: Motor torque current command value
$\theta_m$: Position command input In general, where θm is a motor shaft position, $\theta_l$ is a load shaft position, and N is a reduction ratio, the angular transmission error $\theta_{TE}$ of a strain wave gearing is the difference between a theoretical load shaft position $\theta_m/N$ calculated from the motor shaft position $\theta_m$ and an actual load shaft position $\theta_l$. The angular transmission error $\theta_{TE}$ of a strain wave gearing is defined in the following equation 1.

$$\theta_{TE} = \theta_l - \theta_m/N \qquad \text{(Equation 1)}$$

Angular transmission error in the strain wave gearing occurs due to error in machining a gear or error in assembling constituent parts, and is synchronous with the relative rotation of the constituent parts. The angular transmission error can be measured as follows. Specifically, the positioning of a very small feed angle is performed for one load shaft rotation in which gear meshing completes one cycle, and the angular transmission error when the positioning is completed is measured for every positioning.

Figure 2:
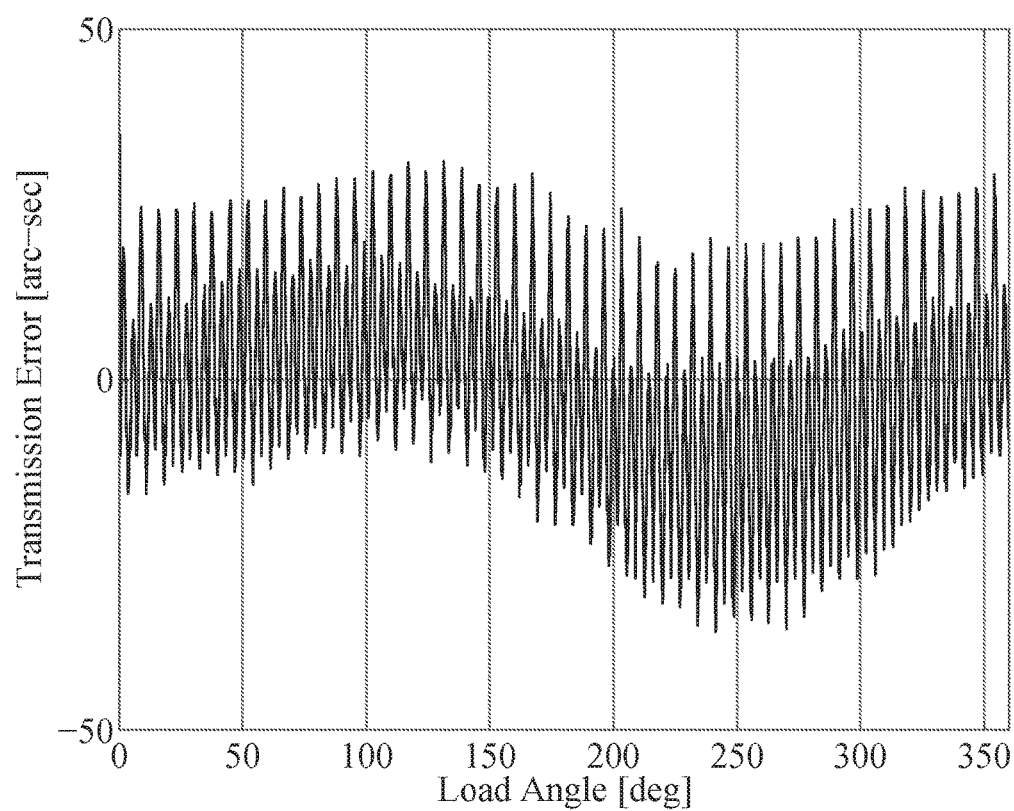
FIG. 2 is a graph showing results obtained by measuring angular transmission error for one rotation of a load shaft.
Figure 3:
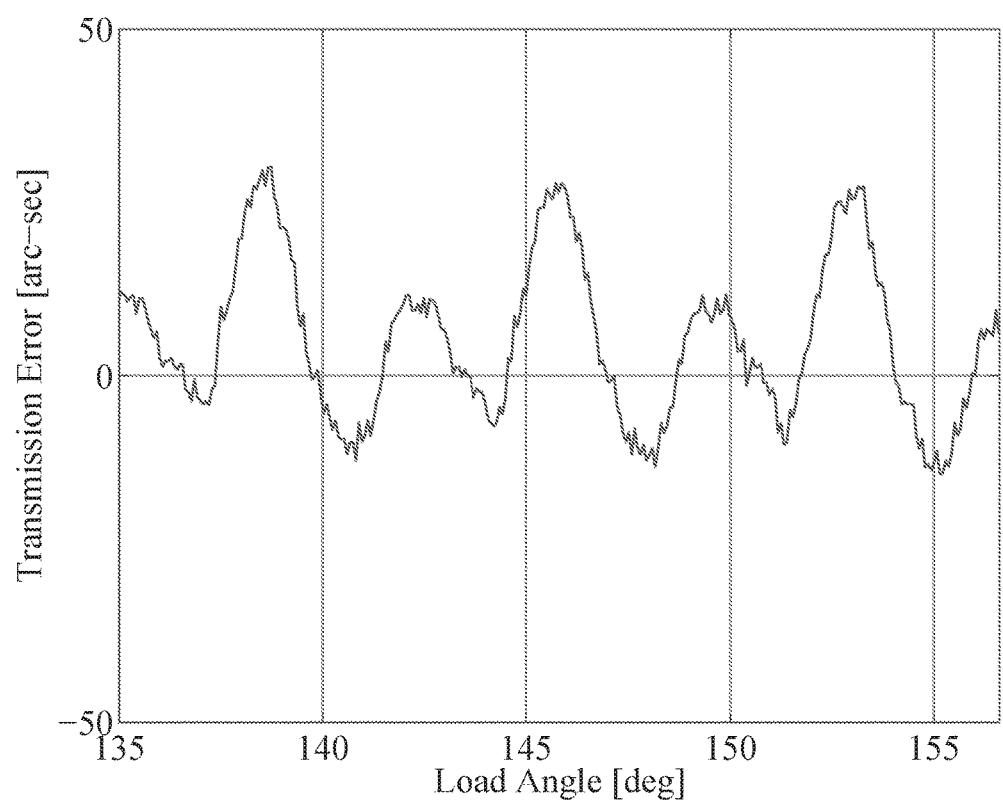
FIG. 3 is a graph showing results obtained by measuring angular transmission error for three rotations of a motor shaft.
Figure 4:
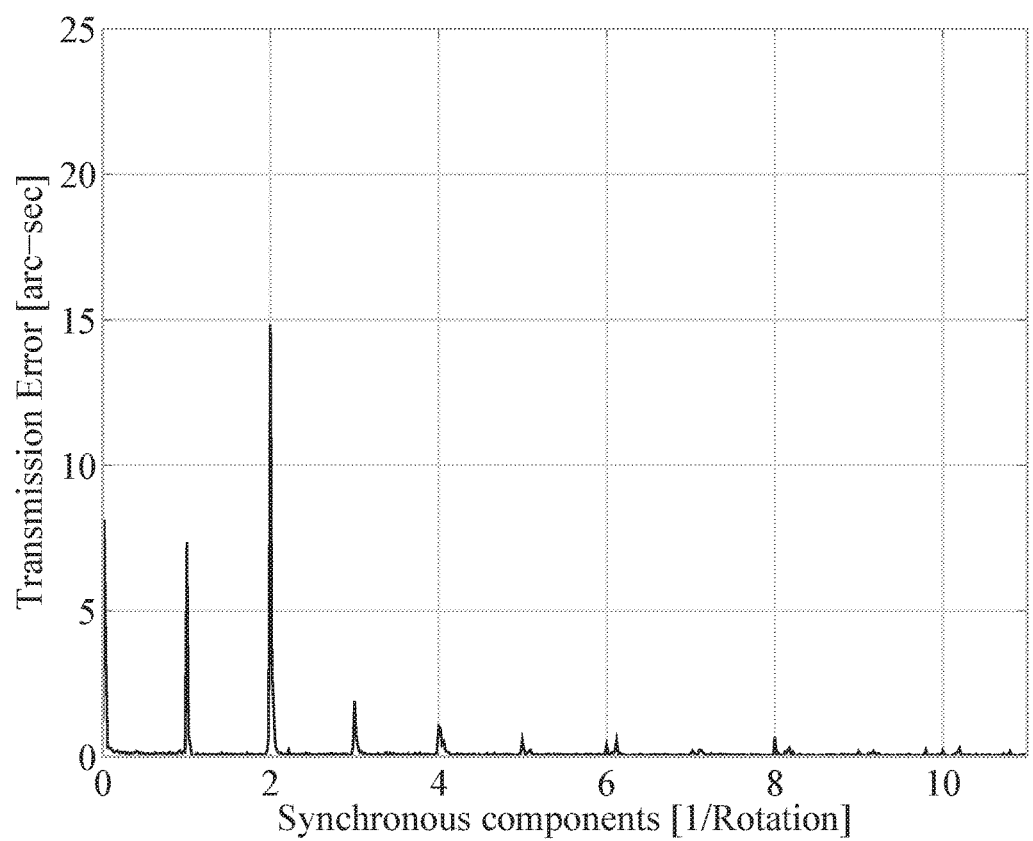
FIG. 4 is a graph showing spectral analysis results of results obtained by measuring angular transmission error.

FIG. 2 is a graph showing results obtained by measuring angular transmission error for one rotation of a load shaft, FIG. 3 is a graph showing results obtained by measuring three rotational cycles of a motor shaft, and FIG. 4 is a graph showing spectral analysis results of the measurement results.

The horizontal axis in FIG. 4 standardizes motor rotation. A periodic component can be confirmed from FIGS. 2 and 3. It can be recognized from FIG. 4 that in angular transmission error, frequency components that are twice the size of the motor rotation period, in particular, are the main components.

[Analysis of Vibration Caused by Angular Transmission Error]

It is well-known that when the frequency of angular transmission error and the gear resonant frequency match, resonant vibration is excited during acceleration and deceleration, and gear vibration and noise are generated.

Figure 5:
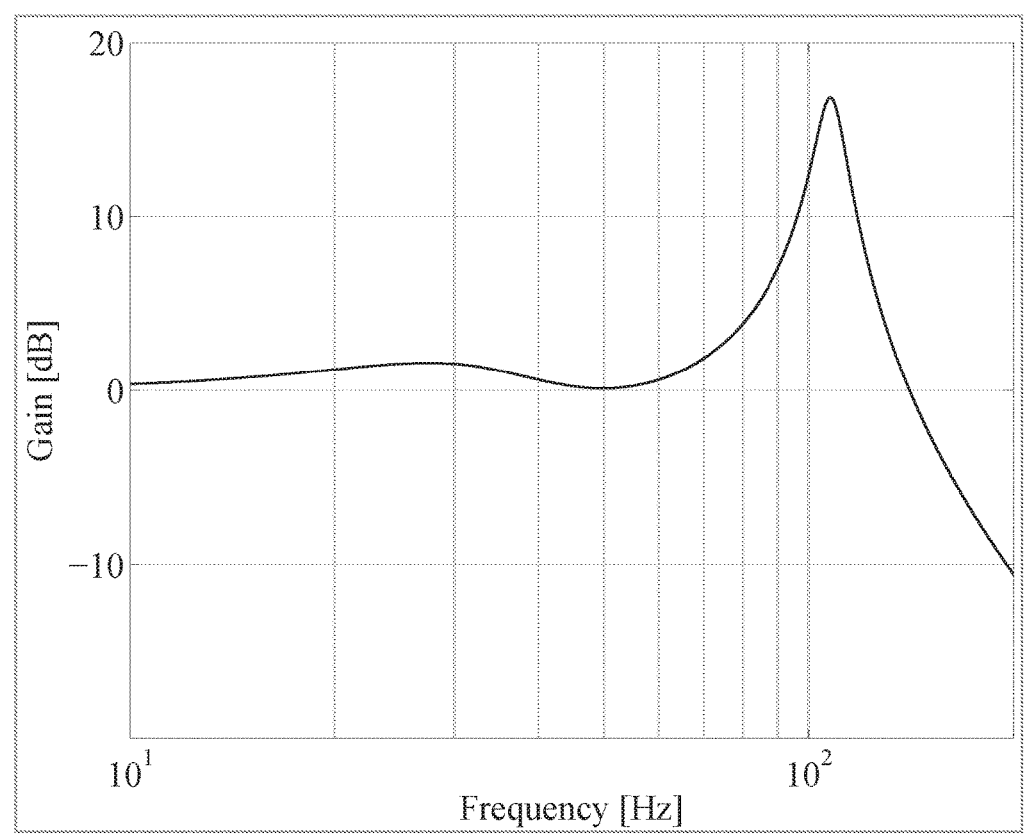
FIG. 5 is a graph showing a frequency characteristic from angular transmission error to a load position.

FIG. 5 is a graph showing a frequency characteristic from angular transmission error $\theta_{sync}$ to a load shaft position $\theta_l$. It is understood from FIG. 5 that a transmission characteristic $G_l$ has a resonance characteristic in the vicinity of 100 Hz, and vibration is excited at the load shaft position when a component at 100 Hz is inputted to the angular transmission error $\theta_{sync}$.

FIG. 6 is a graph showing results from the performance of a constant acceleration test in order to analyze vibration caused by the angular transmission error $\theta_{sync}$. FIG. 6(*a*) shows a load velocity response, and FIG. 6(*b*) shows a load position vibration component. FIG. 6 shows a vibrational response when the load velocity is in the vicinity of 60 rpm in particular. In the constant acceleration test, the motor velocity when the frequency of the angular transmission error is 100 Hz is 3000 rpm, and the reduction ratio N of the strain wave gearing is 50; therefore, the load velocity is 60 rpm. Accordingly, this vibration is caused by the angular transmission error.

[Design of Control System]

(Design of State-Feedback Control System)

A compensation method utilizing state-feedback control is adopted in the positioning control device 3 (see FIG. 1), because control performance deteriorates greatly due to resonant vibration caused by angular transmission error, as previously described.

Figure 7:
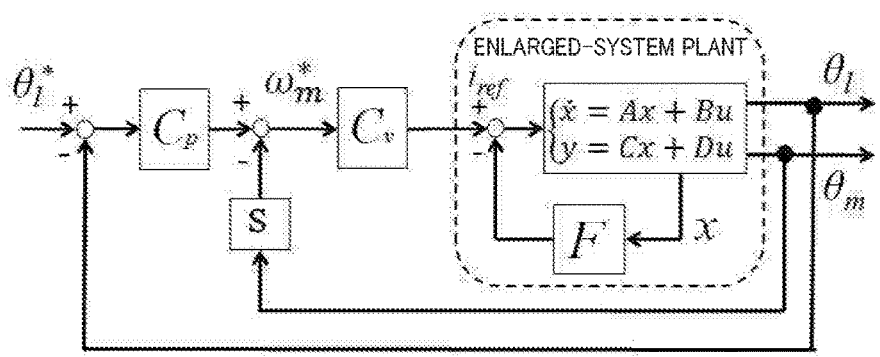
FIG. 7 is a block diagram showing a state-feedback control system in which motor shaft/load shaft encoders are used.

FIG. 7 is a block diagram showing a state-feedback control system in which both an encoder is disposed on a motor shaft and a load shaft, the state-feedback control system using both motor shaft position and load shaft position detected thereby. In the drawing, F shows the state-feedback gain, $C_p$ show s a position-proportional compensator, and $C_v$ shows a velocity-proportional integral compensator. The state-feedback control system is designed for a state-feedback control system having this configuration on the assumption of pole placement for a closed-loop system including a prior-art P-PI control system. Specifically, (1) P-PI compensator gain (position-proportional gain, velocity-proportional gain, velocity-integral gain) is determined, and the closed-loop-system pole placement when F=0 is confirmed.

(2) In order to change only the attenuation of a vibration pole that is not on the real axis among poles in a closed-loop system confirmed by (1), a state-feedback gain F is derived so that the vibration pole is arranged perpendicular to a pole on the real axis.

In the design sequence, provided that the gain of the P-PI compensator is determined, the state-feedback gain F in which the vibration pole has adequate attenuation can be uniquely derived, enabling a simple design.

State equations for the object of control used in the design of the state-feedback control system are shown in the following equations 2-8.

$$\begin{cases} \dot{x} = Ax + Bu \\ y = Cx + Du \end{cases} \quad \text{(Equation 2)}$$

$$x = [\theta_m \ \omega_m \ \theta_l \ \omega_l]^T \quad \text{(Equation 3)}$$

$$y = [\theta_m \ \theta_l]^T \quad \text{(Equation 4)}$$

$$A = \begin{bmatrix} 0 & 1 & 0 & 0 \\ -\dfrac{K_g}{N^2 J_m} & \dfrac{-D_g - N^2 D_m}{N^2 J_m} & \dfrac{K_g}{N J_m} & -\dfrac{D_g}{N J_m} \\ 0 & 0 & 0 & 1 \\ \dfrac{K_g}{N J_l} & \dfrac{D_g}{N J_l} & -\dfrac{K_g}{J_l} & -\dfrac{D_g + D_l}{J_l} \end{bmatrix} \quad \text{(Equation 5)}$$

$$B = \begin{bmatrix} 0 & \dfrac{K_t}{J_m} & 0 & 0 \end{bmatrix}^T \quad \text{(Equation 6)}$$

$$C = \begin{bmatrix} 1 & 0 & 0 & 0 \\ 0 & 0 & 1 & 0 \end{bmatrix} \quad \text{(Equation 7)}$$

$$D = [0 \ 0]^T \quad \text{(Equation 8)}$$

(Pole Placement Design for Closed-Loop System)

The relationship between pole placement of a closed-loop system and pole placement of an enlarged-system plant of a state-feedback control system will be made more clear. $G_{r \rightarrow load}$ is shown in equation 9 using $G_{v \rightarrow motor}$ and $G_{v \rightarrow load}$, where $G_{r \rightarrow load}$ is a transfer function of a closed-loop system from a command to a load shaft, $G_{v \rightarrow motor}$ is a transfer function from an input of an enlarged-system plant to a motor shaft, and $G_{v \rightarrow load}$ is a transfer function from an input of an enlarged-system plant to a load shaft in FIG. 7.

$$G_{r \rightarrow load} = \frac{G_{v \rightarrow load} C_p C_v}{1 + (C_p G_{v \rightarrow load} + s G_{v \rightarrow motor}) C_v}. \quad \text{(Equation 9)}$$

Separating $G_{r \rightarrow load}$, $G_{v \rightarrow motor}$, and $G_{v \rightarrow load}$ into polynomial expressions of numerators and denominators results in the following equations.

$$G_{r \rightarrow load} = \frac{N_{cl}}{D_c} \quad \text{(Equation 10)}$$

$$G_{v \rightarrow load} = \frac{N_{pl}}{D_p} \quad \text{(Equation 11)}$$

$$G_{v \rightarrow motor} = \frac{N_{pm}}{D_p} \quad \text{(Equation 12)}$$

Substituting equation 10, equation 11, and equation 12 into equation 9 gives the following.

$$\frac{N_{cl}}{D_c} = \frac{\dfrac{N_{pl}}{D_p} C_p C_v}{1 + \left(C_p \dfrac{N_{pl}}{D_p} + s \dfrac{N_{pm}}{D_p}\right) C_v} \quad \text{(Equation 13)}$$

$$= \frac{N_{pl} C_p C_v}{D_p + (C_p N_{pl} + s \cdot N_{pm}) C_v}$$

The denominator polynomials on the left and the right in equation 13 result in the following.

$$D_c = D_p + (C_p N_{pl} + s \cdot N_{pm}) C_v \quad \text{(Equation 14)}$$

Accordingly, the denominator polynomials of the enlarged-system plant result in the following.

$$D_p = D_c - (C_p N_{pt} + s \cdot N_{pm}) C_v \quad \text{(Equation 15)}$$

The pole placement of the enlarged-system plant and the state-feedback gain F can be derived, using equation 15, from the pole placement in the closed-loop system in which the attenuation of the vibration pole was changed.

Figure 8:
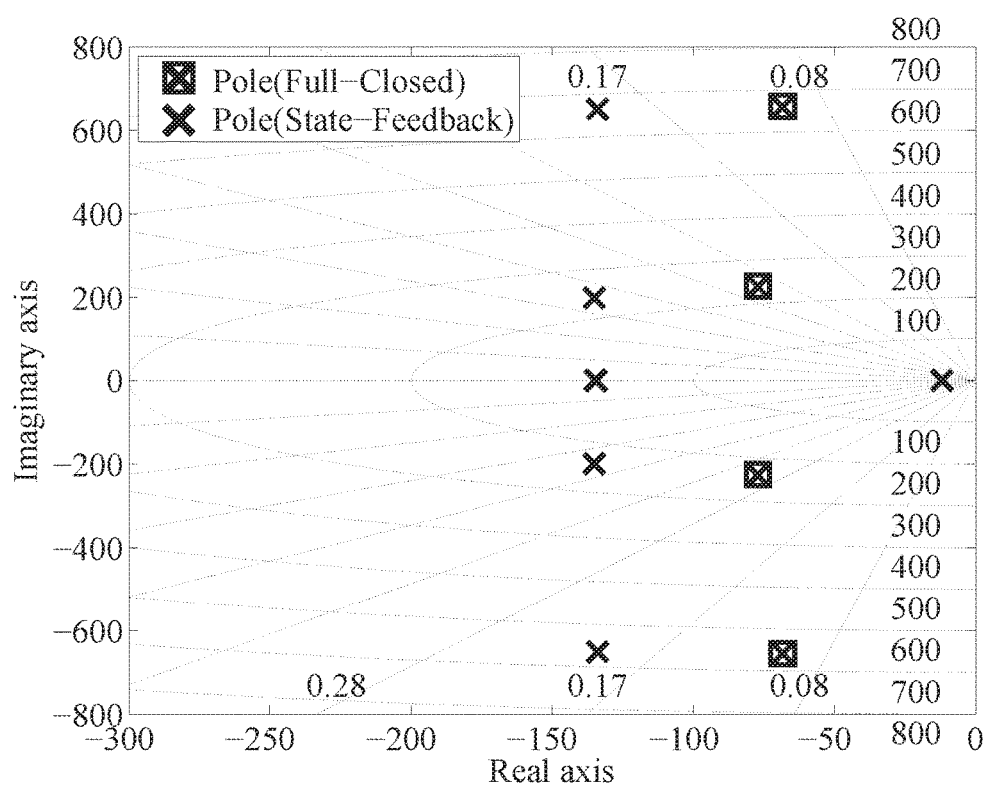
FIG. 8 is a graph showing pole placement in a closed-loop system.

FIG. 8 is a pole placement view of a closed-loop system designed according to the abovementioned procedure. It can be confirmed that design can be performed so that the attenuation of the vibration pole in the full-closed control system is changed, and the vibration pole is arranged perpendicular to the pole of the real axis.

(Design of State Observer)

In the present invention, there is provided a full-closed control system with a state observer in which a motor shaft position and a velocity are estimated by a state observer in order to realize a full-closed control system using only load shaft information, and motor shaft information is not required.

The state quantities and state equations of an object of control used in the design of the state observer are shown in equations 16-19. In the following equations, $d_m$ is the motor disturbance.

$$\dot{x}_p = A_p x_p + B_p i_{ref} \quad \text{(Equation 16)}$$

$$x_p = [\theta_m \ \omega_m \ \theta_l \ \omega_l \ d_m]^T \quad \text{(Equation 17)}$$

$$A_p = \begin{bmatrix} 0 & 1 & 0 & 0 & 0 \\ -\dfrac{K_g}{J_m N^2} & -\dfrac{D_g + N^2 D_m}{J_m N^2} & \dfrac{K_g}{J_m N} & \dfrac{D_g}{J_m N} & -\dfrac{1}{J_m} \\ 0 & 0 & 0 & 1 & 0 \\ \dfrac{K_g}{J_l N} & \dfrac{D_g}{J_l N} & -\dfrac{K_g}{J_l} & -\dfrac{D_g + D_l}{J_l} & 0 \\ 0 & 0 & 0 & 0 & 0 \end{bmatrix} \quad \text{(Equation 18)}$$

$$B_p = \begin{bmatrix} 0 & \dfrac{K_t}{J_m} & 0 & 0 & 0 \end{bmatrix}^T \quad \text{(Equation 19)}$$

Figure 9:
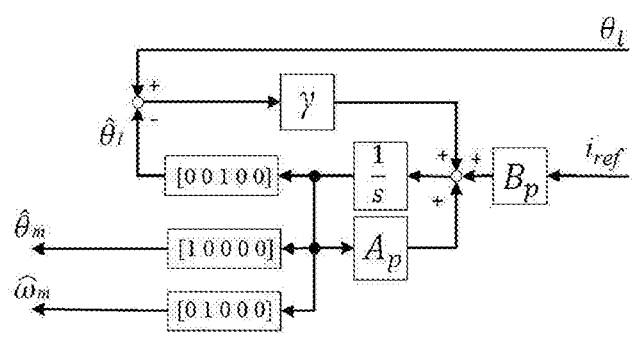
FIG. 9 is a block diagram showing a state observer.
Figure 10:
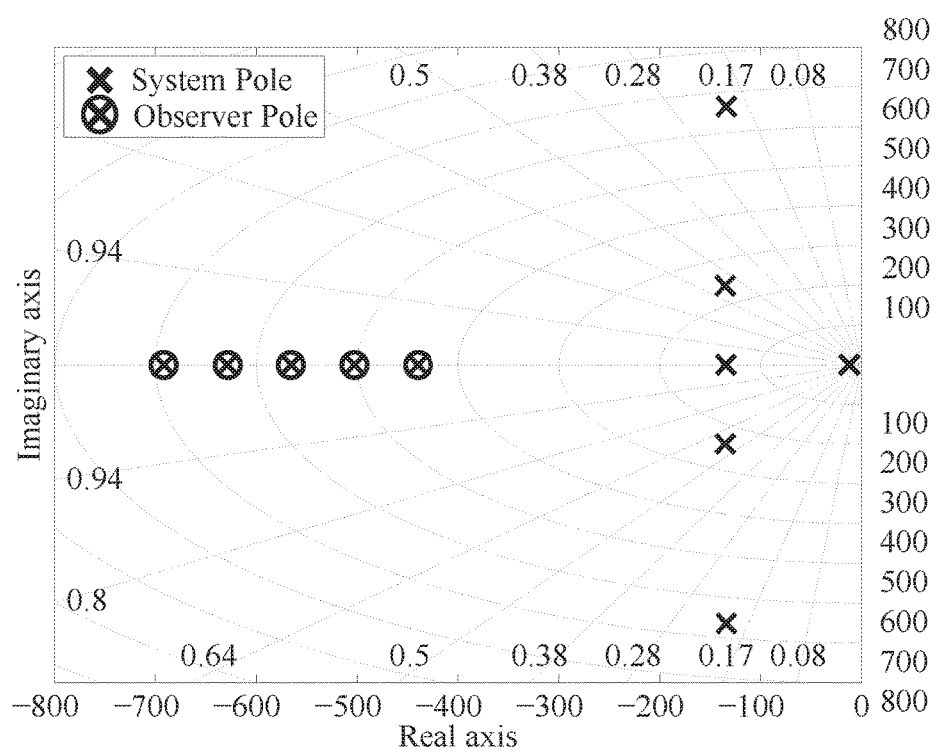
FIG. 10 is a graph showing a closed-loop system pole and an observer pole.

FIG. 9 is a block diagram of a state observer. The reference labels in the drawing are as follows.

γ: Observer gain
$\hat{\theta}_m$: Estimated motor shaft position
$\hat{\omega}_m$: Estimated motor shaft velocity In general, a pole of a state observer should be placed on a high-band side in relation to a pole of a closed-loop system, but when a pole is placed too near a high-band side, the influence of disturbance and noise is readily felt. In view of this, it was decided to place the pole of the state observer in the position indicated by the × mark enclosed by a circle, in relation to the pole of the closed-loop system indicated by the × mark in FIG. 10.

(State-Feedback Control System with State Observer)

Figure 11:
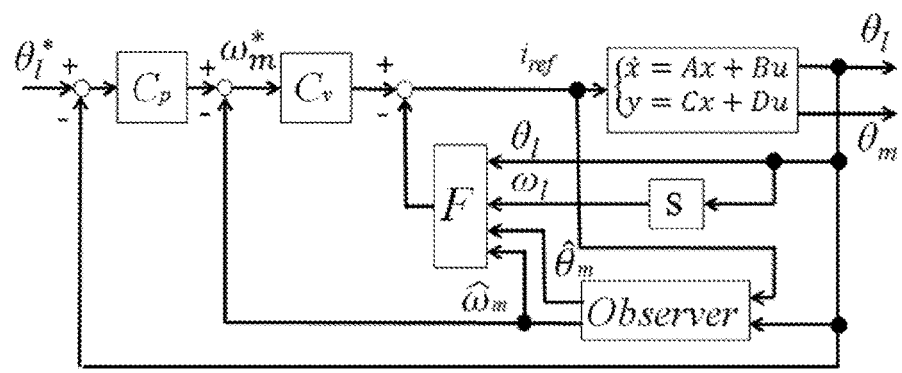
FIG. 11 is a block diagram showing a state-feedback control system according to the present invention in which only load shaft encoder information is used.

FIG. 11 is a block diagram showing a state-feedback control system with a state observer having a built-in state observer designed as described above. FIG. 12 is a graph showing frequency responses for each type of designed control system, FIG. 12(a) shows an open-loop transmission characteristic, FIG. 12(b) is a Nyquist diagram, FIG. 12(c) shows a closed-loop transmission characteristic (from a command to a load shaft), and FIG. 12(d) shows an angular transmission error characteristics from angular transmission error to a load shaft.

Each line labeled in FIG. 12 expresses the following control systems. The lines in FIGS. 13 and 14 have the same meanings.

Semi-Closed: Semi-closed control system
Full-Closed: Full-closed control system
State-Feedback: State-feedback control system using motor shaft/load shaft encoder
State-Feedback with Observer: State-feedback control system with state observer (proposed control system)

It is understood from FIGS. 12(a) and 12(b) that a state-feedback control system, which is the control system proposed in the present invention, has the same stability margin as prior-art semi-closed control systems/full-closed control systems. On the basis of FIG. 12(d), the state-feedback control system can maximally reduce gain at 100 Hz, which is the frequency at which vibration from angular transmission error is prominent. Although the influence of angular transmission error is more readily experienced in the control system proposed in the present invention than in a state-feedback control system, it can be confirmed that gain can be reduced further than in prior-art semi-closed control systems/full-closed control systems.

[Real Equipment Verification]

The effectiveness of the proposed control system was verified by a drive test using the positioning system shown in FIG. 1. To that end, response comparison was performed between the aforedescribed P-PI semi-closed control system, the P-PI full-closed control system, and a state-feedback control system using motor shaft/load shaft encoders. As the real equipment experiment, a low-acceleration experiment in which the influence of vibration caused by angular transmission error is pronounced was carried out in order to evaluate damping, and a high-acceleration test was carried out in order to evaluate high-velocity/high-accuracy positioning as tracking evaluation.

(Characteristic Analysis by Low-Acceleration Test)

A characteristic of the proposed control system during a low-acceleration experiment was verified by a real equipment experiment. FIG. 13 shows the response when using real equipment during a low-acceleration test, and Table 1 shows control performance evaluation as a quantitative evaluation. In FIG. 13, (a) is the load velocity, and (b) is the load position vibration component.

TABLE 1

|  | Semi-Closed | Full-Closed | State-FB | State-FB (w/Observer) |
|---|---|---|---|---|
| Amplitude [arc-sec (%)] | 252.8 (100) | 162.3 (59.7) | 83.1 (32.9) | 110.0 (43.6) |
| Area [arc-sec · s (%)] | 372.4 (100) | 346.1 (93.0) | 268.8 (72.2) | 329.8 (88.6) |

On the basis of FIG. 13, the resonant vibration is suppressed between 16 and 18 s in the case of the proposed control system, as compared to the cases of the state-feedback control system, the semi-closed control system, and the full-closed control system. However, in the proposed control system, as seen from the frequency characteristic of FIG. 12(d), the gain in the vicinity of 40 to 80 Hz is greater than the other control systems, and therefore the vibration is greater between 11 and 15 s.

Table 1 shows that the greatest amplitude of the load position vibration component is kept to 43.6% and the vibration area is kept to 88.6% in the proposed control system, as contrasted with the semi-closed control system, and vibration can be suppressed to the same extent as in the case of a state-feedback control system without using a motor shaft encoder.

(Characteristic Analysis Using High-Acceleration Test)

The characteristic of the proposed control system during a high-acceleration experiment was verified using an experiment performed using real equipment. FIG. 14 shows a real equipment response during a high-acceleration experiment, where (a) shows the motor position settling vicinity, and (b) shows the shaft position settling vicinity.

On the basis of FIG. 14, steady-state deviation and variation in the proposed control system can be compressed, the load position can be settled faster than conventional semi-closed control systems and full-closed control systems, and positioning control can be performed with the same accuracy as conventional state-feedback control systems. This is due to the fact that a higher P-PI control system gain can be established.

As described above, a full-closed state-feedback control system with a state observer was designed for the purpose of suppressing resonant vibration caused by angular transmission error in an actuator where the strain wave gearing is installed as a reduction gear, and the effectiveness thereof was verified using real equipment.

In the proposed control system, positioning control allowing settling to a target position without deviation in the load position could be performed without using more sensors than in prior-art semi-closed control systems, and vibration near 100 Hz, which is the resonant frequency, could be suppressed to the same extent as a state-feedback control system using motor shaft/load shaft encoders.

The invention claimed is:

1. A positioning control device of an actuator provided with a strain wave gearing, for driving and controlling the actuator provided with a configuration in which a rotation of a motor is reduced by the strain wave gearing and transmitted to a load shaft, and performing positioning control of the load shaft, the positioning control device comprising:
   a state-feedback control system with a state observer as a full-closed control system for driving and controlling the motor so that the load shaft is positioned at a target position, on the basis of an actually detected load position;
   wherein the state observer estimates motor shaft position and motor velocity based in the load shaft position and control inputted to the motor of the actuator in the state-feedback control system, the actuator being an object of control; and
   the state-feedback control system feeds back a state quantity of the object of control, using the load shaft position as well as estimated motor shaft position and estimated motor velocity obtained from the state observer, and
   wherein, when designing the state-feedback control system,
   both the motor shaft position and the load shaft position are fed back, P-PI compensator gain in a closed-loop system that includes a P-PI control system for performing positioning control on the load shaft is determined, and pole placement of the closed-loop system when a state-feedback gain of the state-feedback control system is zero is confirmed; and
   the state-feedback gain is derived so that, from among the poles in the confirmed closed-loop system, a vibration pole is arranged perpendicular to a pole on the real axis in order to change only attenuation of a vibration pole that is not on the real axis.

2. The positioning control device of the actuator provided with the strain wave gearing according to claim 1,
   wherein the actuator, which is the object of control, used in a design of the state-feedback control system is regarded as a dual inertial system model comprising a motor, a spring, and a load, and state equations thereof are represented by the following equations:

$$\begin{cases} \dot{x} = Ax + Bu \\ y = Cx + Du \end{cases}$$

$$x = [\theta_m \; \omega_m \; \theta_l \; \omega_l]^T$$

$$y = [\theta_m \; \theta_l]^T$$

$$A = \begin{bmatrix} 0 & 1 & 0 & 0 \\ -\frac{K_g}{N^2 J_m} & \frac{-D_y - N^2 D_m}{N^2 J_m} & \frac{K_g}{N J_m} & \frac{D_g}{N J_m} \\ 0 & 0 & 0 & 1 \\ \frac{K_g}{N J_l} & \frac{D_g}{N J_l} & -\frac{K_g}{J_l} & -\frac{D_g + D_l}{J_l} \end{bmatrix}$$

$$B = \begin{bmatrix} 0 & \frac{K_t}{J_m} & 0 & 0 \end{bmatrix}^T$$

$$C = \begin{bmatrix} 1 & 0 & 0 & 0 \\ 0 & 0 & 1 & 0 \end{bmatrix}$$

$$D = [0 \; 0]^T,$$

and the state quantity and state equations used in a design of the state observer are represented in the following equations:

$$\dot{x}_p = A_p x_p + B_p i_{ref}$$

$$x_p = [\theta_m \; \omega_m \; \theta_l \; \omega_l \; d_m]^T$$

$$A_p = \begin{bmatrix} 0 & 1 & 0 & 0 & 0 \\ -\frac{K_g}{J_m N^2} & -\frac{D_g + N^2 D_m}{J_m N^2} & \frac{K_g}{J_m N} & \frac{D_g}{J_m N} & -\frac{1}{J_m} \\ 0 & 0 & 0 & 1 & 0 \\ \frac{K_g}{J_l N} & \frac{D_g}{J_l N} & -\frac{K_g}{J_l} & -\frac{D_g + D_l}{J_l} & 0 \\ 0 & 0 & 0 & 0 & 0 \end{bmatrix}$$

$$B_p = \begin{bmatrix} 0 & \frac{K_t}{J_m} & 0 & 0 & 0 \end{bmatrix}^T,$$

where
$J_m$: Motor shaft inertial moment
$D_m$: Motor shaft viscosity coefficient of friction
$J_l$: Load shaft inertial moment
$D_l$: Load shaft viscosity coefficient of friction
$D_g$: Viscosity coefficient of friction for reduction gear
$N$: Reduction ratio of strain wave gearing
$K_t$: Motor torque constant
$K_g$: Spring characteristic
$\theta_m$: Motor shaft position
$\omega_m$: Motor velocity
$\theta_l$: Load shaft position
$\omega_l$: Load velocity
dm: Motor disturbance
$i_{ref}$: Motor torque current command value
$\theta^*_m$: Position command input.

* * * * *